Feb. 23, 1926.
J. S. BALL
1,573,795
AUTOMATIC SAFETY PICK-UP DEVICE FOR AUTOMOBILES
Filed Sept. 24, 1925    2 Sheets-Sheet 1
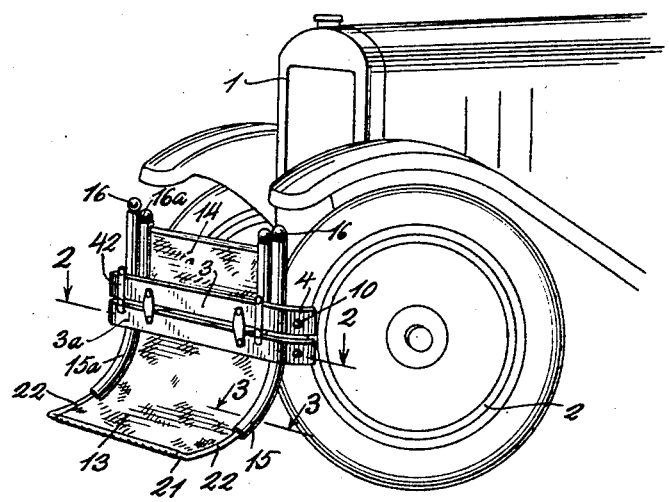
Fig.1.
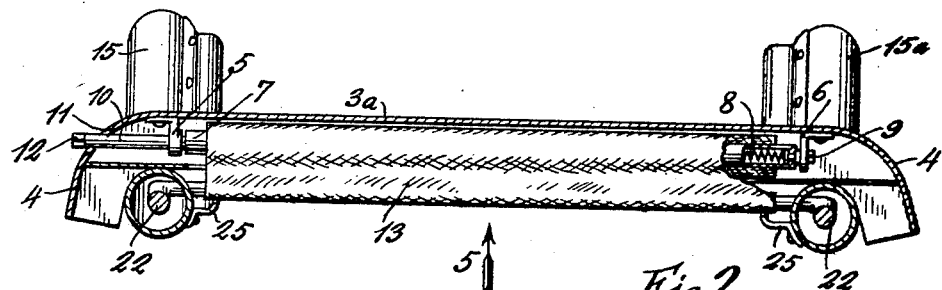
Fig.2.
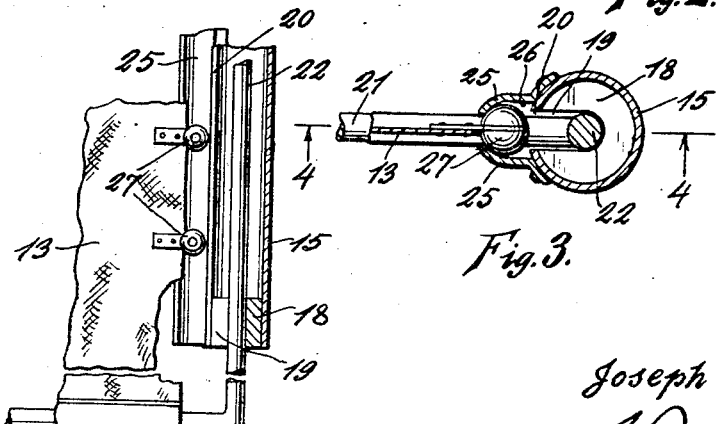
Fig.3.
Fig.4.
Inventor
Joseph S. Ball.
By A. J. O'Brien
Attorney

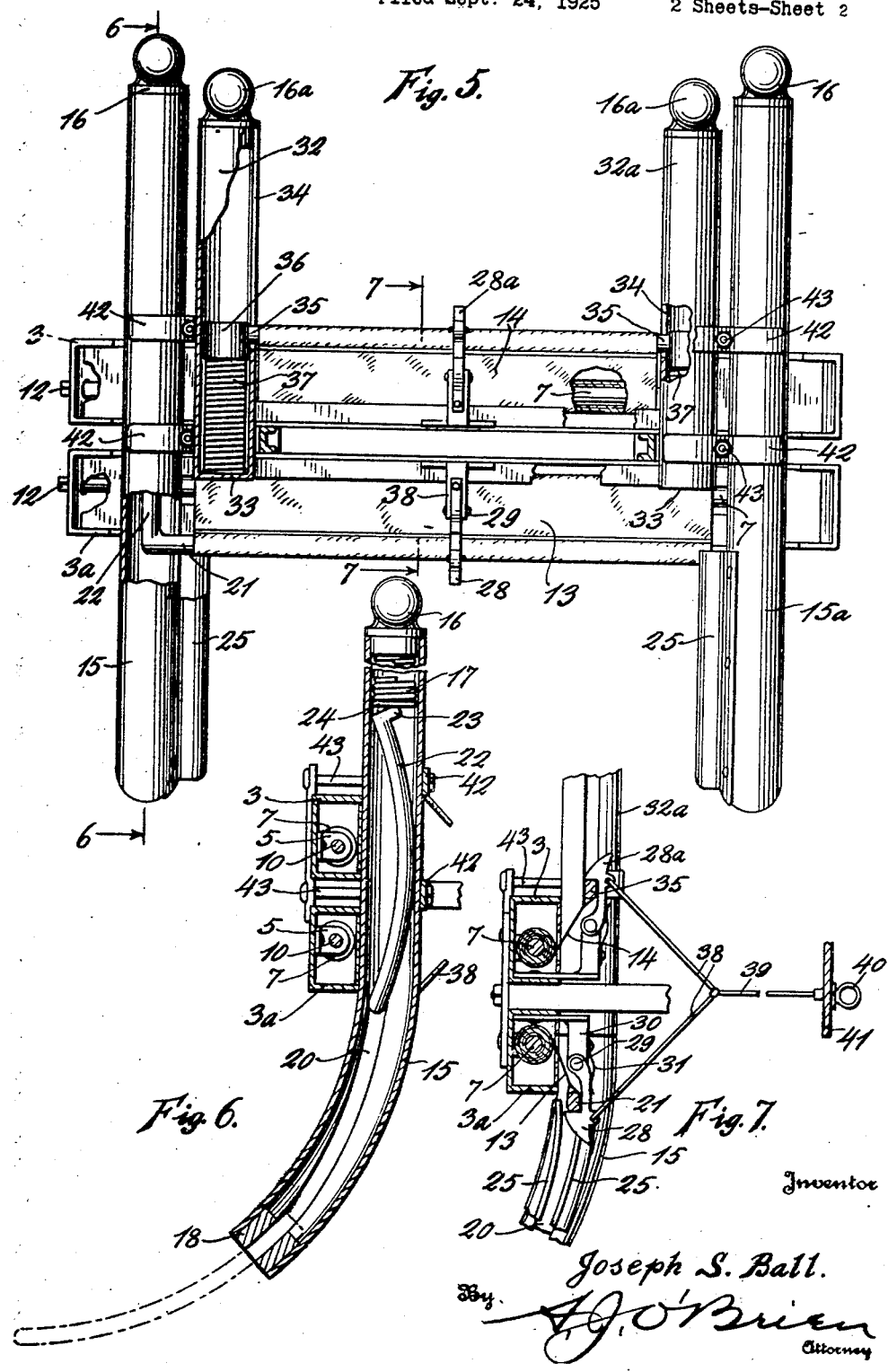

Patented Feb. 23, 1926.

1,573,795

UNITED STATES PATENT OFFICE.

JOSEPH S. BALL, OF DENVER, COLORADO, ASSIGNOR OF ONE-HALF TO ALICE T. MOORE, OF DENVER, COLORADO.

AUTOMATIC SAFETY PICK-UP DEVICE FOR AUTOMOBILES.

Application filed September 24, 1925. Serial No. 58,288.

*To all whom it may concern:*

Be it known that I, JOSEPH S. BALL, a citizen of the United States, residing at the city and county of Denver and State of Colorado, have invented certain new and useful Improvements in Automatic Safety Pick-Up Devices for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this application.

This invention relates to improvements in safety devices for automobiles and has special reference to an attachment that can be readily applied to automobile bumpers.

The automotive vehicles are becoming very numerous with the result that many accidents occur. Automobiles of the type known as pleasure cars are comparatively light and are usually supplied with efficient brakes which makes it possible to stop them in a very short distance wherefore accidents are rare in proportion to the large number of cars in daily use. Trucks and large passenger busses are heavy and are also heavily loaded with the result that when they are in motion, they have an enormous momentum that cannot be immediately overcome. These vehicles, therefore, require a considerable distance for stopping. If a pedestrian suddenly appears in the way of such a heavy vehicle, he is almost sure to be injured as it is impossible to stop with the requisite quickness. Cars of all types are usually provided with bumpers, which, however, are of very small value in protecting pedestrians from injury, being mostly used for the purpose of protecting the car from injury in parking.

It is the object of this invention to produce a device that can be combined with the bumpers in ordinary use or which can be used in lieu of bumpers, and which can be made instantly available for catching a person or an animal that would otherwise be knocked down and run over. This invention, briefly described, comprises one or two rollers containing a strip of strong canvas rolled thereonto in the manner of a shade, means comprising a spring for unrolling said canvas and a catch for holding the canvas from being unrolled. When need occurs the catch is released and the canvas is suddenly shot downwardly towards the ground by the action of the springs and forms an apron that will catch the object in front of the car. If desired there may be two aprons, one of which is shot downwardly in the manner described and the other of which is projected upwardly.

My invention which has been outlined and briefly described will now be described in detail, reference for this purpose being had to the accompanying drawings in which the present preferred embodiment of the invention has been illustrated and in which:

Fig. 1 is a perspective view of the front end of an automobile showing a pair of bumper bars in place thereon and to which my safety device has been attached;

Fig. 2 is a section taken on line 2—2 Fig. 1;

Fig. 3 is a section taken on line 3—3, Fig. 1;

Fig. 4 is a section taken on line 4—4, Fig. 3;

Fig. 5 is a view looking in the direction of the arrow 5 in Fig. 2 with portions broken away to better disclose the construction;

Fig. 6 is a section taken on line 6—6, Fig. 5, and

Fig. 7 is a section taken on line 7—7, Fig. 5.

Numeral 1 designates the radiator of an automobile and 2 the front wheels. Secured to the chassis by any suitable means are two channel shaped bumper bars 3, 3ª that project slightly to the outside of the front wheels and are curved rearwardly at their ends in the manner indicated by numeral 4. Secured to the bottom of each channel are two brackets 5 and 6. A tubular roller 7 is mounted for rotation between each pair of said brackets and has a spring 8, one end of which is secured to the nonrotatable extension 9 and the other end of which is connected to the roller in a manner corresponding with the construction employed in ordinary curtain shade rollers. The other end of the roller 7 has an extended trunnion 10 that projects out through an opening 11 in the curved end of the bumper (Fig. 2) and terminates in a squared portion 12 that is adapted to be engaged by a suitable crank (not shown) by means of which the roller may be rotated. Secured at one end to said rollers are strips of canvas 13 and 14 which may be rolled onto the rollers 7 in the same way that a curtain shade is rolled onto its roller. Fastened to the rear side of the bumper bars 3 and 3ª are tubular members 15 and 15ª whose lower ends are curved forwardly in the manner shown in Figs. 1 and 6. The upper end of each tubular member is closed by a plug 16 that serves as the upper abutment for a coiled compression spring 17. The lower end of each tubular member is partly closed by a plug 18 which has a radial slot 19 that registers with the curved slot 20. A U-shaped member comprising a straight side 21 and curved ends 22 is operatively associated with the tubular members. The ends 22 project into the tubular members in the manner shown in Figs. 1, 4, 5 and 6 and are provided at their inner ends with offset portions 23 that engage the washer 24 upon which the lower end of the spring 17 rests. The straight part 21 extends through the slots 20 and the lower or outer end of the canvas 13 is secured to the straight part 21 in the manner shown in Figs. 1, 2 and 5. When the springs 17 are unrestrained, they force the U-shaped member downwardly and outwardly until the stops 23 engage the inner or upper surface of the plugs 18 when the parts assume the position shown in Fig. 1 and shown dotted in Fig. 6. As the U-shaped member is moved downwardly the canvas 13 is unrolled from the roller 7 and forms a downwardly projecting apron (Fig. 1). It is evident that the canvas would project in a straight line from the roller to the bar 21 unless it was forced to assume a curved position by means of guides. I have, therefore, applied to each side of the slot 20 a guide member 25 whose inner surfaces cooperate to form a channel 26 for the reception of the spherical guide members 27 that are secured to the side edges of the canvas 13 in the manner shown in Figs. 3 and 4. If a crank is applied to the squared end 12 of the trunnion 11 of the lower roller 7 and the roller rotated in a direction to wind the canvas thereon, the tension produced in the canvas will move the arms 22 upwardly against the action of the springs 17 until the parts reach the position shown in Figs. 6 and 7. In order to retain the parts in the collapsed position, I have provided a hook 28 which is pivoted at 29 to a bracket 30 and which is acted upon by a spring 31 which urges it against the canvas 13. When the parts have been collapsed to the position shown in Fig. 7, the hook engages beneath the rod 21 and holds the parts in collapsed position. If the hook is pulled back out of engagement with the rod 21, the springs 17 will immediately function to project the parts to the position shown dotted in Fig. 6. Secured in parallel relation with the tubular members 15 and 15ª are two other tubular members 32 and 32ª whose lower ends are closed as indicated by numeral 33. These tubes have slots 34 in their sides and have their upper ends closed by ornamental plugs 16ª. A straight bar 35 has its ends secured to cylindrical plugs 36 that are slidably mounted within said tubes. Coiled compression springs 37 lie within the tubular members 32 and extend between the bottoms 33 and the plugs 36 and tend to move the plugs 36 and the bar 35 upwardly. The canvas 14 has one end secured to the upper roller 7 and its other end fastened to the bar 35. When the parts are in collapsed position they are held in this position by means of a hook 28ª that is similar in every respect to the hook 28 and functions in the same way. If hook 28ª is moved back out of holding position, the bar will immediately be moved upwardly by the springs 37. For the purpose of releasing the hooks 28 and 28ª, I have connected them by means of wires or flexible metal cables 38 and 39 with a ring 40 on the face of the instrument board 41. The driver by grasping the ring 40 and giving this a quick pull, releases the hooks 28 and 28ª and thereby permits the canvas aprons to be quickly moved into the position shown in Fig. 1. The means that I have shown for moving the parts to collapsed position, as well as the means provided for holding them collapsed and for releasing them, is illustrative only and may be replaced by any other means that is found to be suitable for this purpose. The tubular members 15, 15ª, 32 and 32ª may be secured to the bumper bars 3 and 3ª by any suitable means, but as an example of one means I have shown clamps 42 that are held in place by bolts 43.

Normally the parts are kept in collapsed position (Figs. 1, 5, 6 and 7). When an emergency arises, the driver pulls the ring 40 and moves the hooks 28 and 28ª to inoperative position, thereby permitting the parts to move to the position shown in Fig. 1 in which the canvas aprons will function to catch anything that may be in the way. With my safety device, it becomes possible for the driver to save a human or an animal from being run over under conditions that would make it impossible to save them in any other way.

Having now described my invention, what I claim as new is:

1. An automatic safety pick up device for automobiles comprising, in combination, a roller, means for securing said roller in horizontal position in front of an automobile, a flexible fabric having one end secured to the roller and adapted to be rolled thereonto and therefrom, the other end of said fabric being secured to a bar, means for guiding said bar towards and away from said roller, spring means for urging said bar away from the roller, means for holding it in collapsed position and means for rendering the holding means inoperative.

2. An automatic safety pick up device for automobiles comprising, in combination, a pair of spaced parallel rollers, means for securing said rollers in horizontal position in front of an automobile, a flexible fabric secured to each roller and adapted to be rolled thereonto and therefrom, the free ends of said fabric being secured to a straight bar, means comprising springs for producing a force tending to move said bar away from the rollers so as to unwind the fabric from the rollers, means for guiding the bar when it moves, means for moving said bar to collapsed position adjacent said rollers, means for holding said bar in collapsed position and means for rendering the holding means inoperative.

3. An automatic safety pick up device for automobiles comprising, in combination, a pair of spaced, parallel bumper bars, means for securing said bars to the front end of an automobile and for holding them in horizontal position, a pair of spaced tubular guides secured, in vertical position, to the rear of said bars, said guides having portions extending both above and below said bars, a second pair of tubular guides secured to said bars, said last named guides extending above said bumpers only, each of said pairs of guides having aligned guide slots, transverse rods having their ends extending through the slots and into said tubular guides, springs within said guides, said springs being operatively associated with said rods and tensioned to move the rods away from said bars, a roller secured to the back of each bumper bar, a flexible fabric member secured between each roller and each transverse rod, means for winding the fabric onto the rollers and collapsing the parts thereby moving the transverse rod towards the rollers in opposition to the action of the springs, means for holding the rod in collapsed position and means for rendering the holding means inoperative and thereby permitting the springs to move the rod along the guides and unrolling the fabric so as to form an apron.

In testimony whereof I affix my signature.

JOSEPH S. BALL.